US007873823B2

(12) United States Patent
Shankar

(10) Patent No.: US 7,873,823 B2
(45) Date of Patent: Jan. 18, 2011

(54) DYNAMICALLY RECONFIGURABLE POWER-AWARE, HIGHLY SCALEABLE MULTIPLIER WITH REUSABLE AND LOCALLY OPTIMIZED STRUCTURES

(76) Inventor: Ravi Shankar, 22360 Sands Pointe Dr., Boca Raton, FL (US) 33431

( * ) Notice: Subject to any disclaimer, the term of this patent is extended or adjusted under 35 U.S.C. 154(b) by 961 days.

(21) Appl. No.: 11/001,207

(22) Filed: Dec. 1, 2004

(65) Prior Publication Data
US 2005/0120069 A1    Jun. 2, 2005

Related U.S. Application Data

(60) Provisional application No. 60/525,928, filed on Dec. 1, 2003.

(51) Int. Cl.
*G06F 9/00* (2006.01)
(52) U.S. Cl. .................. 713/100; 713/300; 713/320

(58) Field of Classification Search ............... 713/100, 713/300, 320
See application file for complete search history.

(56) References Cited

U.S. PATENT DOCUMENTS

| 5,719,800 | A  | * | 2/1998  | Mittal et al. ............... 713/321 |
| 6,810,482 | B1 | * | 10/2004 | Saxena et al. ............. 713/320 |
| 2002/0124219 | A1 | * | 9/2002  | Kuroki ..................... 714/739 |
| 2003/0217297 | A1 | * | 11/2003 | Gschwind et al. ........... 713/300 |

* cited by examiner

*Primary Examiner*—Tse Chen
(74) *Attorney, Agent, or Firm*—Akerman Senterfitt; Mark D. Passler

(57) ABSTRACT

A large bit width multiplier with multiple copies of a core small bit width multiplier and ROM cells. The present invention provides a power system that trades off processing speed against power dissipation. The present invention reduces power dissipation to about half of the best industry implementation at about half the speed. Its power dissipation is 10% of another industry standard implementation at 1.5 times the speed. The present invention has a gate count that is about twice the gate count for these implementations.

16 Claims, 17 Drawing Sheets

Code 1

```verilog
module HSM_8bit ( Out, X, Y );

output      [15:0]      Out;

input [7:0] X;
    input [7:0] Y;

//Internal variables
    wire [8:0] ai;
    wire [8:0] bi;
    wire [7:0] k2;
    wire [7:0] ak2;
    wire [7:0] l2;
    wire [7:0] bl2;
    wire [7:0] kak;
    wire [7:0] lbl;
    wire [1:0] C1_Out;

`define     k       ai[8:5]
    `define     ak      ai[4:1]
    `define     l       bi[8:5]
    `define     bl      bi[4:1]

wire [7:0] error_adjustment;
    wire [7:0] xbar, ybar;
    wire x0bar, y0bar, error, a1, a2, a3, a4, o1, enable, select, n3, errorbar, Cout;
    wire [7:0] x_minus_y, y_minus_x;

parameter   gate_count  = 6;

//Module instantiation
    Square_ROM_4bit         Square_ROM_4bit_1(k2, `k);
    Square_ROM_4bit         Square_ROM_4bit_2(ak2, `ak);
    Square_ROM_4bit         Square_ROM_4bit_3(l2, `l);
    Square_ROM_4bit         Square_ROM_4bit_4(bl2, `bl);
    HSM_4bit                HSM_4bit1(kak, `k, `ak);
    HSM_4bit                HSM_4bit2(lbl, `l, `bl);

Accumulator_16bit       Accumulator_16bit1(Out, ak2, kak, k2, bl2, lbl,
l2, error_adjustment);
    Adder_8bit              Adder_8bit1(ai[7:0],ai[8],X[7:0],Y[7:0],1'b0);
    //=== ai = (X + Y)
    Inverter_8bit           Inverter_8bit1(xbar, X);
    Inverter_8bit           Inverter_8bit2(ybar, Y);
    Adder_8bit              Adder_8bit2(x_minus_y, , X, ybar, 1'b1);
    Adder_8bit              Adder_8bit3(y_minus_x,Cout , xbar, Y, 1'b1);

// Accuracy Adjustment
    not    Not1(x0bar, X[0]);
    not    Not2(y0bar, Y[0]);
    and    And1(a1, x0bar, Y[0]);
    and    And2(a2, X[0], y0bar);
    or     Or1(error, a1, a2);
    not    Not3(errorbar, error);
```

Figure 8

```
Mux_octa_2_to_1 Mux_octa_1(error_adjustment, X, Y, Cout, errorbar);
Mux_octa_2_to_1 Mux_octa_2(bi[7:0], y_minus_x, x_minus_y, Cout, 1'b0);

assign     bi[8] = 1'b0;

initial
    $display("Module :    %m  Gate count   : %d", gate_count);

endmodule
```

Figure 8 [continued]

*Code 2*

```
module      Inverter_16bit(Out, In);

output      [15:0]      Out;
    input [15:0]        In;

parameter   gate_count  = 16;

assign      Out = ~In;

initial
        $display("Module :      %m  Gate count    : %d", gate_count);

endmodule
```

Figure 9

Code 3

```
module Adder_8bit(Out, Cout, X, Y, Cin);

output      [7:0] Out;
    input [7:0] X, Y;
    input       Cin;
    output      Cout;

wire  [6:0] C;

parameter   gate_count = 0;

Full_Adder  FA0(Out[0], C[0], X[0], Y[0], Cin);
    Full_Adder  FA1(Out[1], C[1], X[1], Y[1], C[0]);
    Full_Adder  FA2(Out[2], C[2], X[2], Y[2], C[1]);
    Full_Adder  FA3(Out[3], C[3], X[3], Y[3], C[2]);
    Full_Adder  FA4(Out[4], C[4], X[4], Y[4], C[3]);
    Full_Adder  FA5(Out[5], C[5], X[5], Y[5], C[4]);
    Full_Adder  FA6(Out[6], C[6], X[6], Y[6], C[5]);
    Full_Adder  FA7(Out[7], Cout, X[7], Y[7], C[6]);

initial
        $display("Module  :    %m  Gate count    : %d", gate_count);

endmodule
```

Figure 10

*Code 4*

```verilog
module Mux_octa_2_to_1(Out, In1, In2, Select, Enable);

output          Out;
    reg    [7:0]    Out;
    input  [7:0]    In1, In2;
    input           Select, Enable;

parameter   gate_count = 27;

always @(In1 or In2 or Select or Enable)
    begin
        if(Enable==1)
            Out = 0;
        else
        begin
            if(Select == 1)
                Out = In1;
            else
                Out = In2;
        end
    end initial
        $display("Module  :   %m  Gate count  : %d", gate_count);

endmodule
```

Figure 11

Code 5

```
/*================================================
    4-bit Square ROM Model
    File name: Square_ROM_4bit.vg
    Module name: Square_ROM_4bit
    Input: In (4-bit)
    Output: Out (8-bit)
    Instances:
        None It is the Square ROM 4-bit wide that is it takes
    in 4-bit wide input (In) and outputs its square (Out)
    It is gate level implementation.
================================================*/ module Square_ROM_4bit ( Out, In );

output      [7:0] Out;
    input [3:0] In;

wire    In0bar, In1bar, In2bar, In3bar;

wire  [9:0] a;

parameter   gate_count = 20;

not     Not0(In0bar, In[0]);
    not     Not1(In1bar, In[1]);
    not     Not2(In2bar, In[2]);
    not     Not3(In3bar, In[3]);

and     And1(Out[7], In[3], In[2]);

and     And2(a[0], In[3], In2bar);
    and     And3(a[1], In[3], In[2], In[1]);
    or      Or1(Out[6],a[0], a[1]);

and     And4(a[2], In3bar, In[2], In[1]);
    and     And5(a[3], In[3], In2bar, In[1]);
    and     And6(a[4], In[3], In[2], In[0]);
    or      Or2(Out[5], a[4], a[2], a[3]);

and     And7(a[5], In[2], In1bar, In0bar);
    and     And8(a[6], In3bar, In[2], In[0]);
    and     And9(a[7], In[3], In2bar, In[0]);
    or      Or3(Out[4], a[5], a[6], a[7]);

and     And10(a[8], In[2], In1bar, In[0]);
    and     And11(a[9], In2bar, In[1], In[0]);
    or      Or4(Out[3], a[8], a[9]);

and     And12(Out[2], In[1], In0bar);
```

Figure 12

```
    assign    Out[1]    = 1'b0;
    assign    Out[0]    = In[0];

initial
        $display("Module :    %m  Gate count    : %d", gate_count);

endmodule
```

Figure 12 [continued]

Code 6

```verilog
module Accumulator_16bit (Out, ak2, kak, k2, b12, lb1, l2, error_adjustment);

parameter   gate_count  = 0;

output      [15:0]      Out;
    input [7:0] ak2;
    input [7:0] kak;
    input [7:0] k2;
    input [7:0] b12;
    input [7:0] lb1;
    input [7:0] l2;
    input [7:0] error_adjustment;

wire [15:0]     term1, term2, term3, term3bar;

Adder_16bit Adder_16bit1(term1, , {k2, ak2}, {3'd0, kak, 5'd0} , 1'd0);
    Adder_16bit Adder_16bit2(term2, , term1, {8'd0, error_adjustment}, 1'd0);
    Adder_16bit Adder_16bit3(term3, , {l2, b12}, {3'd0, lb1, 5'd0}, 1'd0);
    Adder_16bit Adder_16bit4(Out, , term2, term3bar, 1'b1);
    Inverter_16bit   Inverter_16bit1(term3bar, term3);

//assign    Out = ak2 + {kak, 3'd0} + {k2, 4'd0} + (~b12) + (~{lb1, 3'd0})
+ (~{l2, 4'd0}) + 3+ error_adjustment;
    initial
        $display("Module  :    %m Gate count    : %d", gate_count);

endmodule
```

Figure 13

Code 7

```
module Adder_16bit(Out, Cout, X, Y, Cin);

output      [15:0]      Out;
    output                  Cout;

input  [15:0]      X;
    input  [15:0]      Y;
    input           Cin;

wire   [14:0]      C;

Full_Adder  FA0(Out[0],  C[0],  X[0],  Y[0],  Cin);
    Full_Adder  FA1(Out[1],  C[1],  X[1],  Y[1],  C[0]);
    Full_Adder  FA2(Out[2],  C[2],  X[2],  Y[2],  C[1]);
    Full_Adder  FA3(Out[3],  C[3],  X[3],  Y[3],  C[2]);
    Full_Adder  FA4(Out[4],  C[4],  X[4],  Y[4],  C[3]);
    Full_Adder  FA5(Out[5],  C[5],  X[5],  Y[5],  C[4]);
    Full_Adder  FA6(Out[6],  C[6],  X[6],  Y[6],  C[5]);
    Full_Adder  FA7(Out[7],  C[7],  X[7],  Y[7],  C[6]);
    Full_Adder  FA8(Out[8],  C[8],  X[8],  Y[8],  C[7]);
    Full_Adder  FA9(Out[9],  C[9],  X[9],  Y[9],  C[8]);
    Full_Adder  FA10(Out[10], C[10], X[10], Y[10], C[9]);
    Full_Adder  FA11(Out[11], C[11], X[11], Y[11], C[10]);
    Full_Adder  FA12(Out[12], C[12], X[12], Y[12], C[11]);
    Full_Adder  FA13(Out[13], C[13], X[13], Y[13], C[12]);
    Full_Adder  FA14(Out[14], C[14], X[14], Y[14], C[13]);
    Full_Adder  FA15(Out[15], Cout , X[15], Y[15], C[14]);

endmodule
```

Figure 14

*Code 7 (a)*

```
module Full_Adder(S, C, x, y, z);

output      S, C;
    input  x,y,z;

assign      S = x ^ y ^ z;
    assign      C = (z & (x ^ y)) | (x & y);

//initial
    //     $display("Module :      %m  ");

endmodule
```

Figure 15

DYNAMICALLY RECONFIGURABLE POWER-AWARE, HIGHLY SCALEABLE MULTIPLIER WITH REUSABLE AND LOCALLY OPTIMIZED STRUCTURES

CROSS REFERENCE TO RELATED APPLICATIONS

The present invention claims priority to U.S. Provisional Patent Application No. 60/525,928, which was filed on Dec. 1, 2003.

FIELD OF THE INVENTION

The present invention is directed to digital signal processing. In particular, the present invention is directed to power management of electronic applications.

BACKGROUND OF THE INVENTION

Power management in mobile embedded systems, such as cell phones, PDAs, and other wireless/portable systems, is considered to be one of the 5 major design challenges by the semiconductor industry forum. Over the next 12 years, the active element (transistor or gate) will get 4 times smaller in length, with the gate count increasing 16 fold, and even with the best power management features, both in software and hardware, a battery budget deficit of 25 fold will ensue. To put things in perspective, to run all the applications (internet, videoconferencing, multimedia, games, etc.,), the system will need to supply power of 2.5 W, while for reasonable battery life of a few days of operation one could not exceed 0.1 W. This is an enormous challenge. The semiconductor industry has always exceeded the goals it set for itself in the past, and we expect the same thing will happen again. A comment is in order here: One needs to distinguish power aware and low power systems. A power-aware system may tradeoff speed against power dissipation as needed at the moment, while maintaining long-term low power strategy. For example, a human may sprint from a source of violence, thus expending energy, while maintaining a low average metabolism during other periods. The key is that the human had the ability to sprint fast when it was warranted. A low power system may be compared to a human who is too energy restricted to rise to the challenge of an imminent attack.

There are examples of the need for improved power systems. Microsoft has released WinCE.net, which is rapidly becoming the de facto standard operating system of mobile systems. WinCE, the earlier version, monitored power dissipation of the entire system and selectively allowed some subsystems to go into sleep or low power modes. However, with the advent of WinCE.net, the concept of scalability has been introduced, allowing the designer to choose the level of power management they wish to use. In addition, scalability has come to peripherals as well. As such, in place of a few discrete states of power dissipation, a device could now potentially have many intermediate levels of power dissipation, used judiciously with a long-term perspective of maintaining battery power for long life. Thus, it is no longer the issue of coarse-grain control of the subsystems, but fine-grain control by the OS (WinCE.net) and self-adaptation by the devices.

This need opens up significant opportunities for dynamically reconfigurable hardware with the intent to adjust, in real-time, the QOS (quality of service) metrics to get the most reasonable result to the end user. Though coordination between software and hardware engineers has always been a challenge, we expect that the Microsoft model of full support for developers will overcome this challenge. It is noted, however, that no chip designers have yet embraced the concept of dynamic reconfiguration to save power or tradeoff power against speed. This will change as more pressure is brought from both the consumer and developers, such as Microsoft.

SUMMARY OF THE INVENTION

The present invention is well-suited to ride the wave of change. DSP (Digital Signal Processing) is an essential, but power hungry feature of all consumer electronics. Battery power of portable systems is directly impacted. Multiply and Accumulate is a common functionality of DSP. Power Dissipation of a multiplier is directly proportional to the square of its word length. Thus, use of two 16-bit multipliers (and a few 16-bit ROM Squarers) will reduce the dissipation to about half of the power dissipation of a 32-bit multiplier. A 16-bit ROM Squarer has the dissipation of an 8-bit multiplier. The method of the present invention targets this type of transformation. The present invention is directed to different architectures that implement the algorithm, with reuse of well-designed ROM cells and smaller bit-width multipliers of any appropriate type as needed. The 16 and 32-bit multipliers of the present invention have significantly lower power dissipation and comparable speed, relative to the current standard Wallace Multiplier and Array Multiplier implementations.

In addition, the present invention may be utilized in embedded software systems as regular localized structures are generally more beneficial to structures with long interconnect wires, as is the case elsewhere, to reduce delay and variation in delay (due to different input data patterns).

As such, the present invention provides a solution to some of the power system problems. The mobile industry will demand more applications on the mobile system at the same power consumption level as of today. Microsoft has released an OS (operating system) that targets this niche. However, the chip designers have not figured out how to take advantage of the dynamic power management feature in the OS (WinCE.net). The present invention, a multiplier, is a major building block in this power management dialog. The present invention shows how to build a multiplier with commonly used ROM and multiplier building blocks to get significantly lower power dissipation for comparable speed. Even with a gate count of twice the other implementations, the overall size may be much closer due to the localized regular structures. Further, we expect that regular localized structures will also improve speed and reduce power dissipation, yet to be validated with an actual implementation.

In particular, in one aspect, the present invention provides a reconfigurable computation circuit architecture, including a plurality of electrically interconnected gates, said plurality of electrically interconnected gates being interconnected by a plurality of reconfigurable connectors, a plurality of memory cells, said plurality of memory cells being interconnected by a plurality of reconfigurable connectors, a plurality of building blocks with these gates and memory cells, that provide one or more functions selected from logic, selection, decision, control, arithmetic functions, polynomial expressions, or a combination thereof, and a dynamic reconfiguration means selected from hardware, software, or combination thereof; wherein said dynamic reconfiguration means controls when to reconfigure said reconfigurable connectors based on at least one preselected criteria, wherein said plurarity of gates are used to switch between a plurality of different computation functions.

In another aspect, the present invention provides a method for reducing power dissipation in a reconfigurable computation circuit architecture, including the steps of determining a selected electrical power utilization using one or more factors, determining a selected level of power dissipation reduction using one or more factors, translating tradeoffs between the one or more factors in the step of determining a selected level of power dissipation reduction to a substantially equivalent change in one or more of digital signal processing algorithms, functionalities, rank order, precision, sequencing, or a combination thereof, determining one or more modes of operation that may be used in a system, estimating savings in power dissipation and determining a time period for each of the one or more modes that may be used in the system, using a software or hardware reconfiguration mechanism to switch to an appropriate bit-width multiplication and higher order polynomial functions, and dynamically monitor a time period of the energy mode of the system and revert to an original mode or a different mode of power usage as needed.

In yet another aspect, the present invention provides a machine readable storage having stored thereon a computer program, said computer program comprising a routine set of instructions for causing the machine to perform the steps of determining a selected electrical power utilization using one or more factors, determining a selected level of power dissipation reduction using one or more factors, translating tradeoffs between the one or more factors in the step of determining a selected level of power dissipation reduction to a substantially equivalent change in one or more of digital signal processing algorithms, functionalities, rank order, precision, sequencing, or a combination thereof, determining one or more modes of operation that may be used in a system, estimating savings in power dissipation and determining a time period for each of the one or more modes that may be used in the system, using a software or hardware reconfiguration mechanism to switch to an appropriate bit-width multiplication and higher order polynomial functions, and dynamically monitor a time period of the energy mode of the system and revert to an original mode or a different mode of power usage as needed.

DETAILED DESCRIPTION OF THE DRAWINGS

Other objects, features and advantages of the will become apparent upon reading the following detailed description, while referring to the attached drawings, in which:

FIGS. 8 to 15 are code sheets for various codes according to different aspects of the present invention.

DETAILED DESCRIPTION OF THE INVENTION

Figure 1:
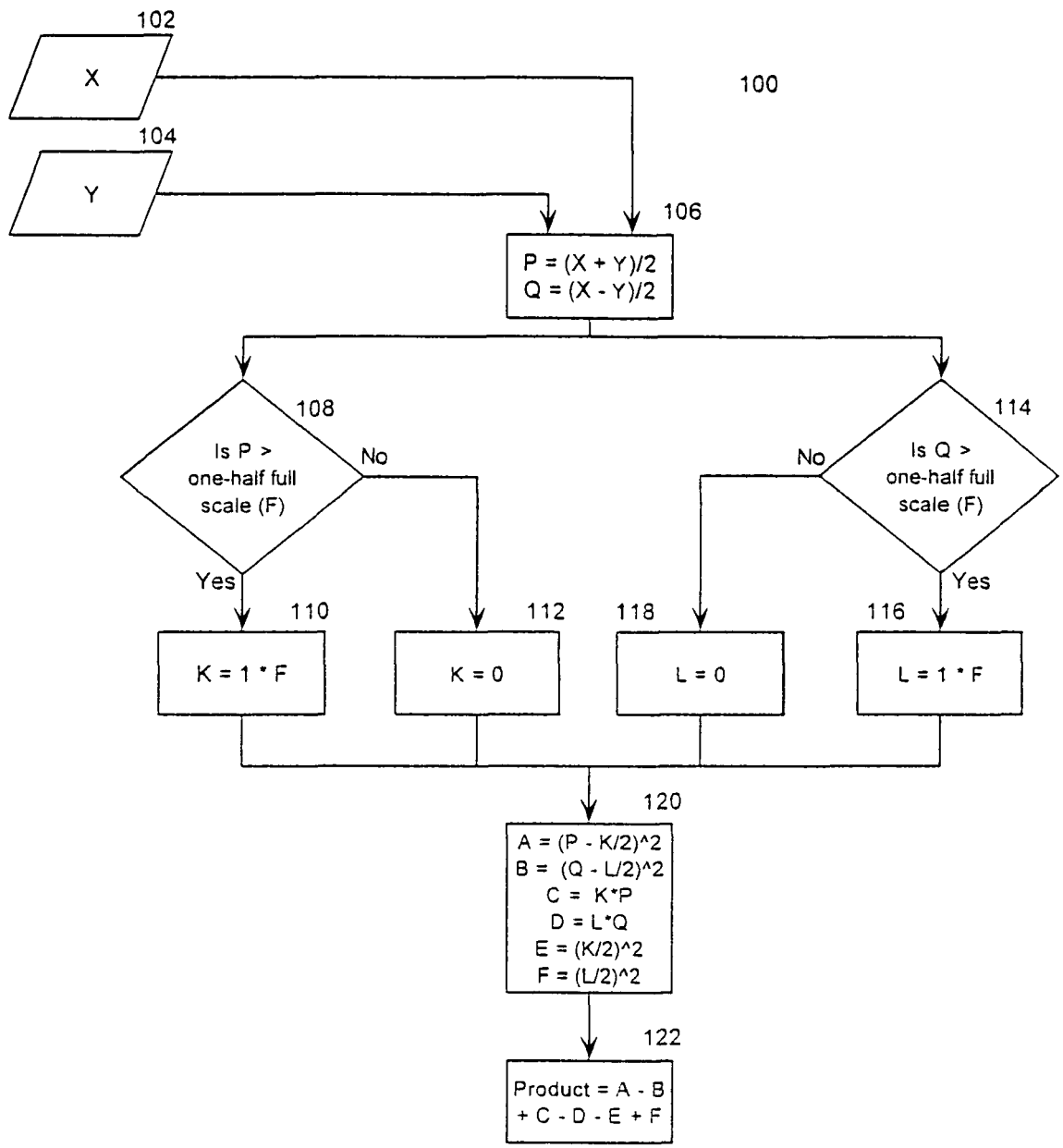
FIG. 1 is a flow chart that illustrates a high speed scalable multiplication method useful in one embodiment of the present invention.
Figure 2:
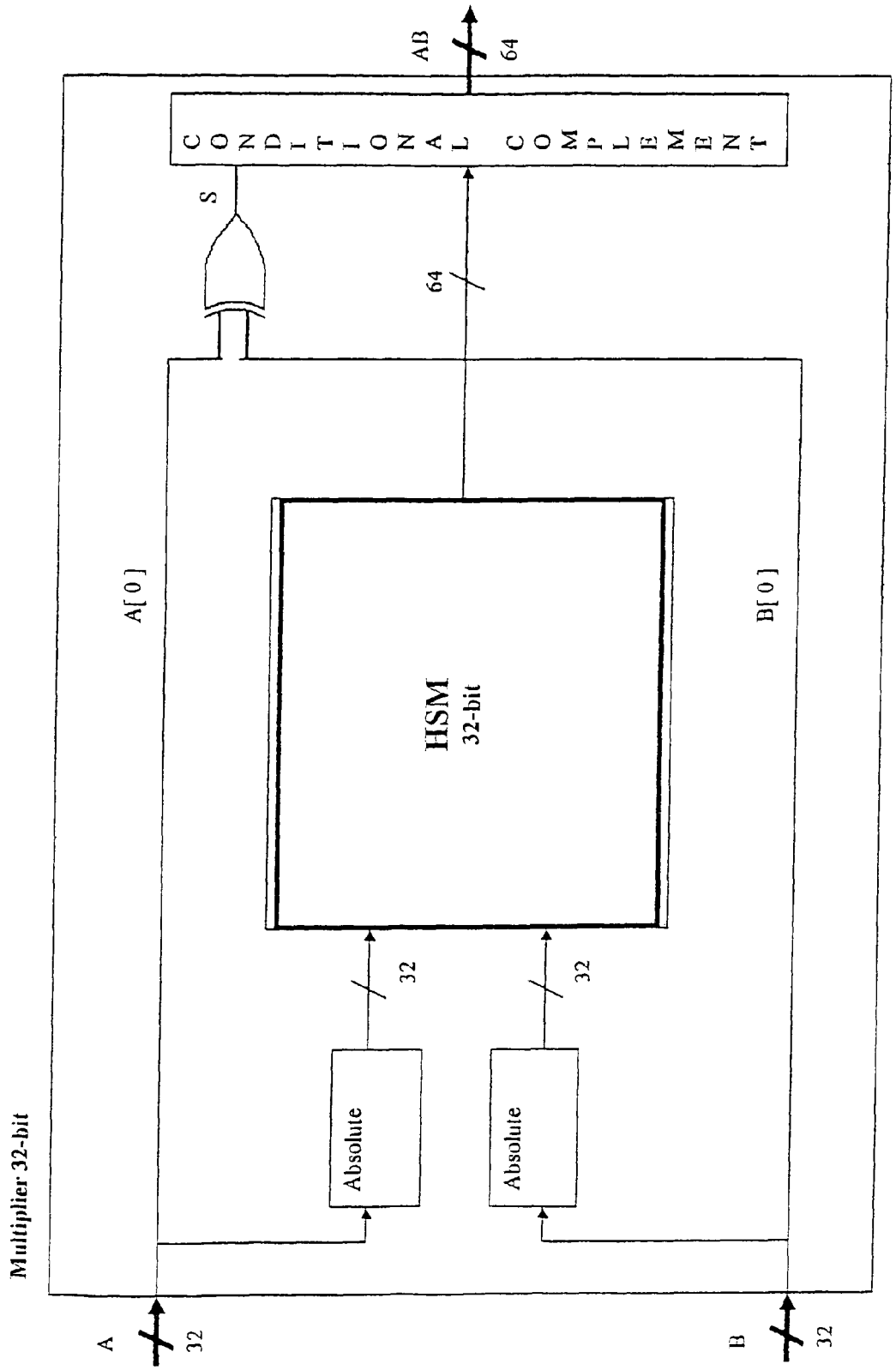
FIG. 2 is a schematic of one embodiment of a 32-bit multiplier according to one aspect of the present invention.
Figure 3:
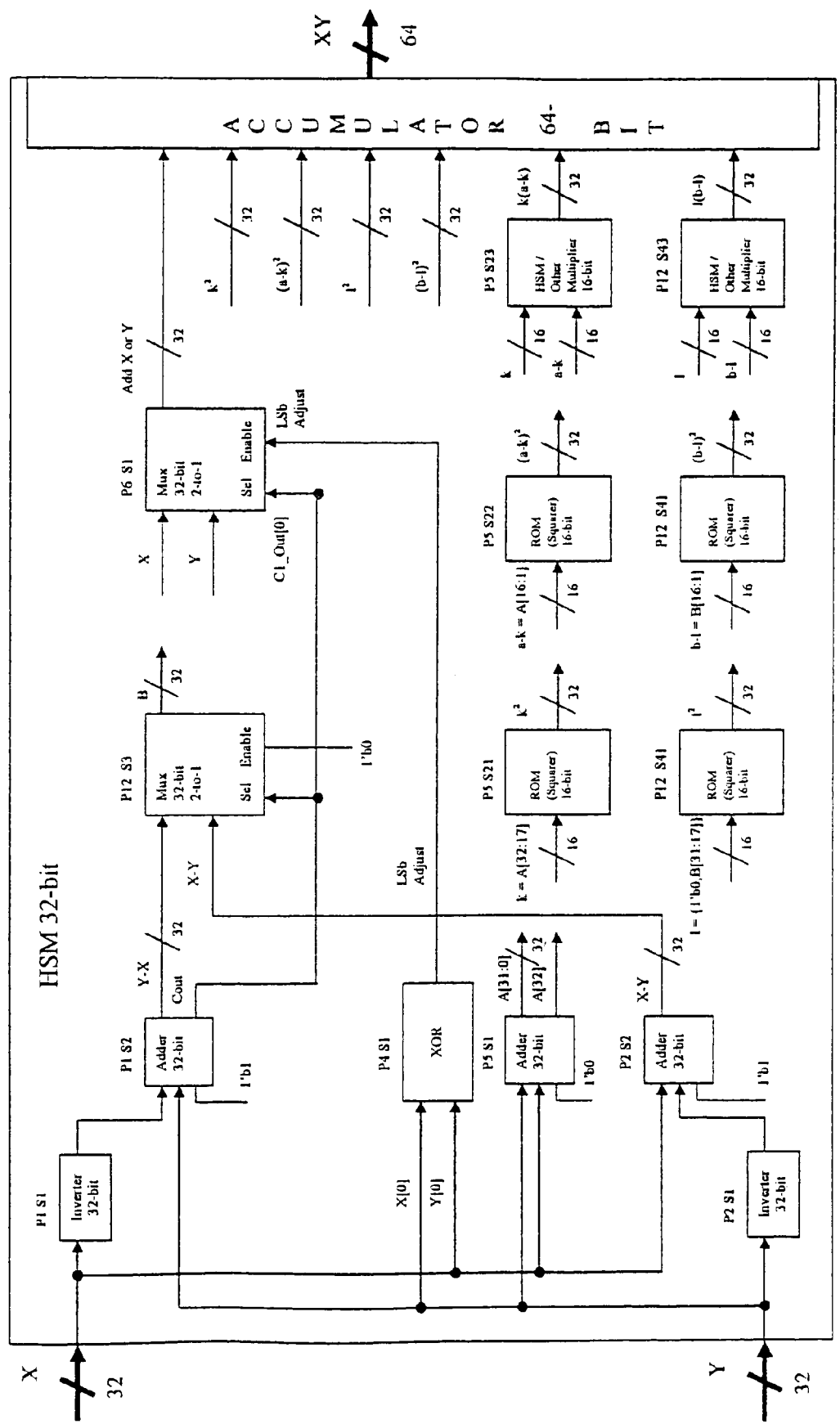
FIG. 3 is a schematic of one embodiment of an implementation of a 32-bit highly scalable multiplier according to one aspect of the present invention.
Figure 4:
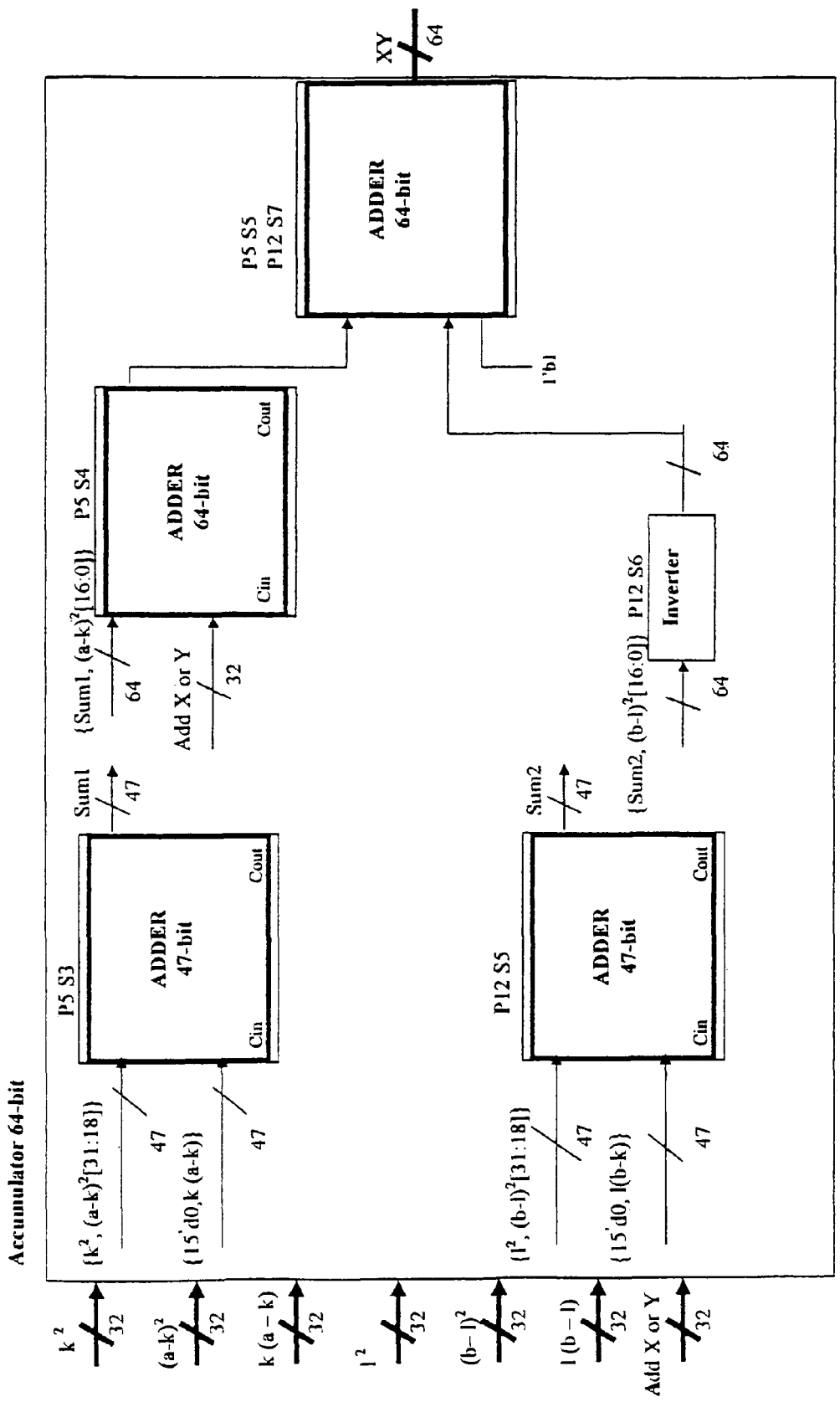
FIG. 4 is a schematic of one embodiment of an implementation of a 64-bit accumulator according to one aspect of the present invention.
Figure 5:
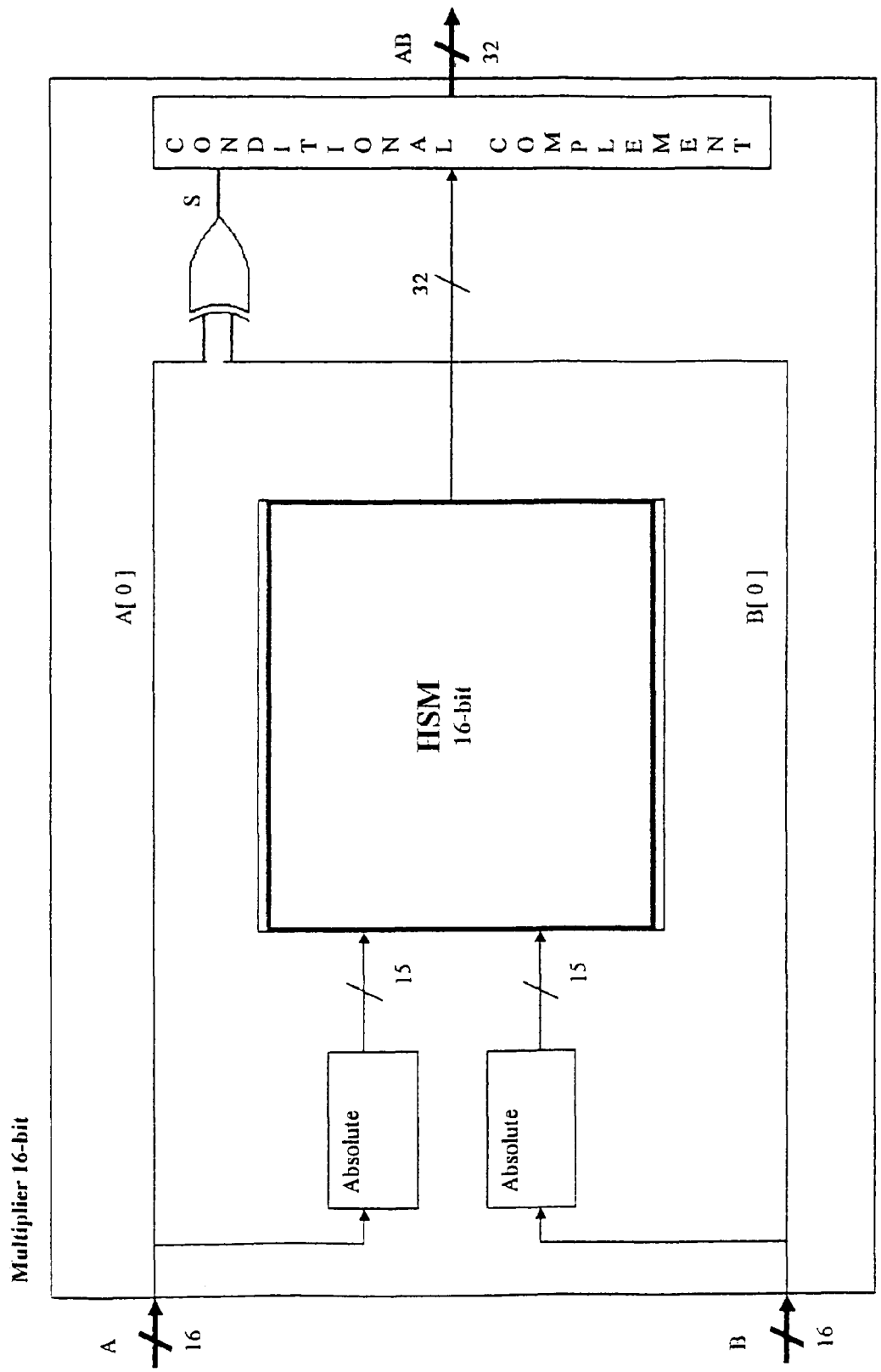
FIG. 5 is a schematic of one embodiment of a 16-bit multiplier according to one aspect of the present invention.
Figure 6:
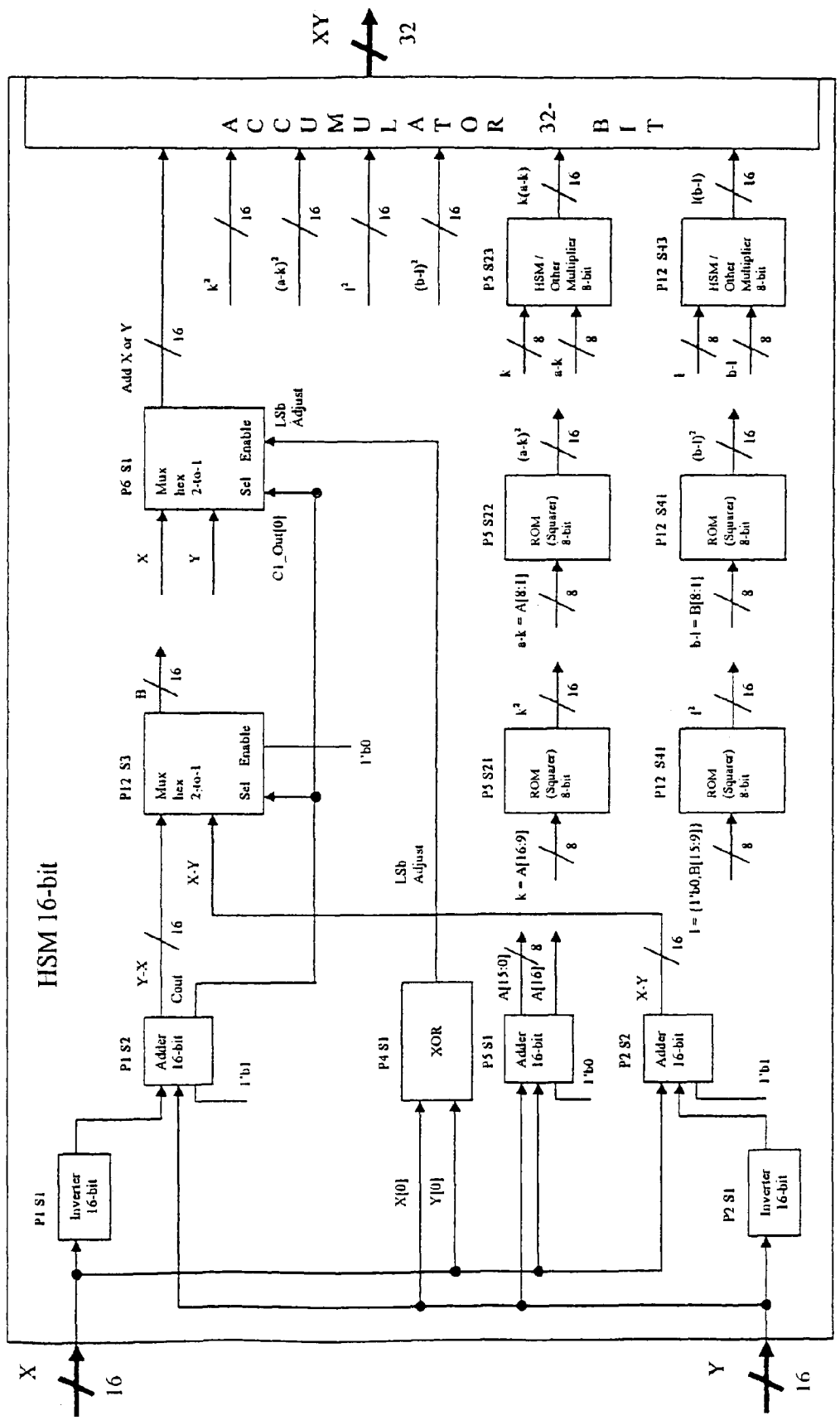
FIG. 6 is a schematic of one embodiment of an implementation of a 16-bit highly scalable multiplier according to one aspect of the present invention.
Figure 7:
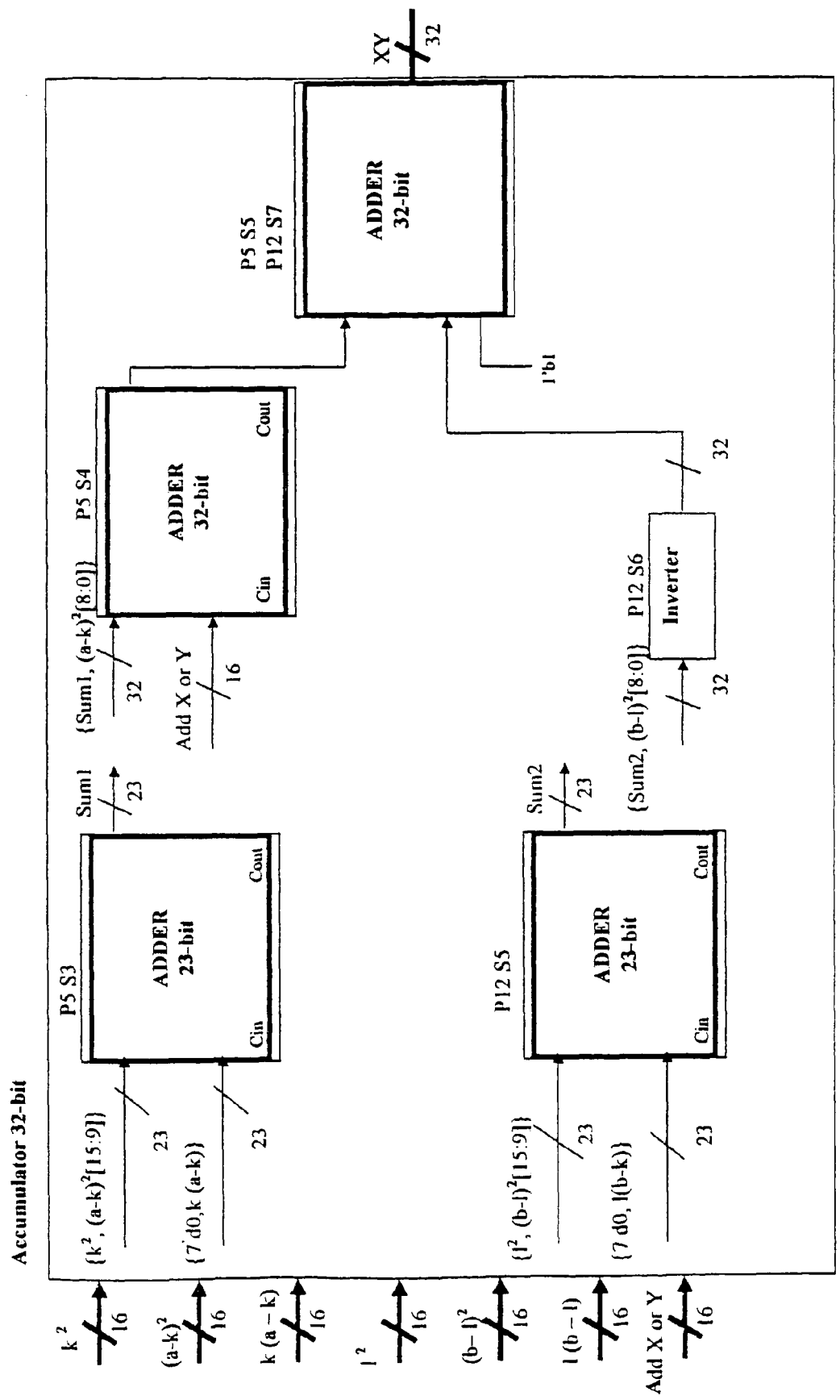
FIG. 7 is a schematic of one embodiment of an implementation of a 32-bit accumulator according to one aspect of the present invention.

The present invention is more particularly described in the following examples that are intended to be illustrative only since numerous modifications and variations therein will be apparent to those skilled in the art. As used in the specification and in the claims, the singular form "a," "an," and "the" may include plural referents unless the context clearly dictates otherwise. Also, as used in the specification and in the claims, the term "comprising" may include the embodiments "consisting of" and "consisting essentially of."

The present invention provides a reconfigurable computation circuit architecture. This reconfigurable computation circuit architecture utilizes a high speed scalable multiplier. The high speed scalable multiplier is designed to selectively utilize a folding multiplier to perform a multiplication operation in a manner in which processor resources, including power dissipation and memory, are allocated optimally. Specifically, based upon the size of individual multipliers and multiplicands, the numeric processor may select either a conventional multiplier or one or more folding multipliers to undertake multiplication in a computing device such as a digital signal processor. In this way, the conventional multiplication operation may be invoked only where such invocation will not overly tax the resources of the computing device, thereby resulting in reduced power consumption during operation of the device.

Current embedded systems involve filters, trigonometry, and other complex functions. On many an occasion, high order polynomial functions are used to represent compactly a set of sampled data points for a highly nonlinear function, at an acceptable level of accuracy. Embedded software developers often use a fast, floating-point processor to prototype systems that will eventually run on a fixed-point processor (such as a 16-bit or a 32-bit digital signal processor from Texas Instruments, Inc., or Motorola). To avoid an inaccurate specification, it is important to realistically simulate the fixed-point processor while generating algorithms based on the prototype.

Put another way, non-linear functions are commonly used in digital signal processing. These use high order polynomials and require the repeated application of the operations of multiply and add. Accordingly, in another aspect of the present invention, the concepts of present invention may be used to utilize the folding concept such that it may be directly applied to many non-linear functions, thus taking advantage of the folding principle, independent of its application to the highly scaleable multiplier. In other words, one does not have to bring down all of the expressions to the level of a multiplier, a squarer, and an adder, before the folding principle may be applied. Thus, one may be able to apply the principle at an earlier stage, and lead to a different, more power efficient implementation, as compared to reductionist concept of identifying multiplies and adds. While not wishing to be bound by theory, these concepts are based upon the belief that any higher level of abstraction provides an alternative implementation, which of course then may be compared to the reductionist approach and determine which one is a better solution for the given problem on hand. Computer algorithms may be written to make this choice automatically. As such, the earlier application of the folding principle of the present invention will yield a more efficient (speed/power/gate count) implementation.

The present invention accomplishes these power savings without a substantial reduction in speed and/or performance. This is accomplished, in part, through an algorithm that utilizes a folding technique. As used herein, "folding" is used to refer to programmatically reducing the size of the multiplicand, multiplier or both until the reduced multiplicand and multiplier are below a threshold at which the conventional multiplication of both will result in optimal utilization of the resources of the computing device. In accordance with the inventive arrangements, however, the folding operation may be performed without compromising the integrity of the product. That is to say, a folding operation that has been configured according to the present invention will not reduce the accuracy of the product and will produce a product which is identical to the product that would otherwise be produced using only a conventional multiplication operation. The threshold for each application may vary, on one or more factors that are discussed in greater detail. However, it is to be understood that even a one bit reduction in resolution can improve the power dissipation substantially, by a factor of 10 raised to 0.069=1.172, that is a 17.2% improvement.

As set forth in greater detail in related application, U.S. Ser. No. 10/004,958, the disclosure of which is hereby incorporated in its entirety, in the high speed scalable multiplier used in the present invention, the multiplication of values may be expressed using an expanded multiplication algorithm:

expanded multiplication algorithm:

$$X*Y=([X+Y]/2)^2-([X-Y]/2)^2$$

Though in a conventional multiplier, this expanded multiplication process may exhaust the resources of the digital device where the multiplicand and multiplier, X and Y, are large, in the present invention, the multiplier and multiplicand may be folded at least once. Upon folding the multiplicand and multiplier, the number of combinations required for a conventional multiplication process may be at least halved, thereby reducing by half the system memory required for the operation.

Notably, if the multiplier and multiplicand are folded a second time, the memory required for the multiplication process may be halved once again to one-fourth of the size required to perform the expanded multiplication process without folding. The folding process may continue recursively to further reduce the amount of memory required to perform the multiplication until an optimum number of foldings has been reached. The optimum number of foldings may vary depending on memory size, calculation speed, and available power.

FIG. 1 is a flow chart illustrating a folding process 100 for computing the product of two values, X and Y, which may be performed in a folding multiplier, and which may reduce the power dissipation experienced and memory required to calculate the product. Beginning in blocks 102 and 104, multiplicand and multiplier X and Y may be received from input and forwarded to the folding multiplier. Using conventional mathematical operations included therein, the folding multiplier may compute the average of X and Y to produce a first folding value (P), where $$P=(X+Y)/2$$

as shown in block 106. The folding multiplier may also compute one-half of the difference of X and Y to produce a second folding value (Q), where $$Q=(X-Y)/2$$

Subsequently, it may be determined concurrently in decision blocks 108 and 114 whether X and Y each has a value which exceeds a folding threshold below which folding values, when multiplied require less than a maximum amount of device resources to conventionally multiply. For example, to process the product of a 16-bit multiplicand and 16-bit multiplier using an 8-by-8 folding multiplier, the folding threshold may be 8 bits. Where either the value of the multiplicand or multiplier exceeds the folding threshold, first and second scaling factors K and L may be applied, respectively, to fold the excessive value below the folding threshold.

Thus, in decision blocks 108 and 114, if either of X or Y is determined to have exceeded the folding threshold, then in blocks 110 and 116, the value which has exceeded the folding threshold may be folded by a factor necessary to reduce the size of the value below the folding threshold. Otherwise, in blocks 112 and 118 the values which do not exceed the folding threshold are not scaled. Hence, to process a 12-bit value using an 8-by-8 folding multiplier, the 12-bit value may be scaled back to eight bits. By comparison, to process a 7-bit value using the 8-by-8 folding multiplier, the 7-bit value need not be scaled.

Referring to block 120, the first scaling factor (K) may be subtracted from the first folding value (P) to produce a first operand, and this first operand may be squared to compute a first square (A), e.g. $A=(P-K/2)^2$ Likewise, the second scaling factor (L) may be subtracted from the second folding value (Q) to produce a second operand, and this second operand may be squared to compute a second square (B)

e.g. $B=(Q-L/2)^2$

A first product (C) may be computed by multiplying the first folding value (P) by the fractional portion of the first scaling factor and a second product (D) may be computed by multiplying the second folding value (Q) by the fractional portion of the second scaling factor. Further, a third square (E) may be computed by squaring the fractional portion of the first scaling factor and a fourth square (F) may be computed by squaring the fractional portion of the second scaling factor. The folded product may then be computed by summing the first square (A), the first product (C) and the fourth square (F), and subtracting from the sum, the second square (B), the second product (D) and the third square (E), e.g. folded product=$A-B+C-D-E+F$ In the instances where the multiplication process is being implemented to square a value, the multiplier and multiplicand may have the same value. Hence, the average of the multiplier and multiplicand is the value being squared and the difference of the multiplier and multiplicand is zero. Thus, the second folding value is zero and the second scaling value may be selected to be zero, resulting in a value of zero for the second square, second product and fourth square. Hence, the folding method may be shortened in such an instance. The folded product for a value being squared may be computed by summing the first square (A) and the first product (C), and subtracting from the sum the third square (E), e.g. folded product=$A+C-E$ Significantly, the multiplier used in the present invention may be a scalable high speed multiplier. Specifically, as the use of a folding multiplier sacrifices performance for power efficiency, the extent of folding performed in the folding multiplier may be selectably adjusted according to changing environmental factors, for example the strength of a battery or the performance requirements of the computing device. Hence, as power efficiency becomes more important during the operation of the computing device, the extent of the folding operation may be increased. By comparison, where power efficiency is not a factor, the less efficient conventional multiplication circuitry may be utilized.

Accordingly, a reconfigurable computation circuit architecture that utilizes this type of high scale multiplier provides systems that have significantly lower power dissipation as a fewer number of transitions are needed in performing the operation. These systems achieve these power savings while still operating at speeds comparable to prior art systems.

The present invention will now be further described through examples. It is to be understood that these examples are non-limiting and are presented to provide a better understanding of various embodiments of the present invention.

EXAMPLES

The present invention may now be described in reference to the following examples and FIGS. 2 to 7. FIGS. 2 to 7 represent the schematic diagrams for a 32-bit and a 16-bit HSM (highly scaleable multiplier) implementation. The following Table 1 lists all the Verilog files that represent the hardware represented in the schematic diagrams. Verilog is a hardware description language that may be used to model, design, simulate and automatically implement the schematic in a chip. This Table summarizes 7 code sheets, which are shown in FIGS. 8 to 15.

TABLE 1

| | |
|---|---|
| Code Sheet 1 | HSM - 8 bit |
| Code Sheet 2 | Inverter - 8 bit |
| Code Sheet 3 | Adder - 8 bit |
| Code Sheet 4 | XOR - 1 bit |
| Code Sheet 5 | ROM Squarer - 4 bit |
| Code Sheet 6 | Accumulator - 16 bit |
| Code Sheet 7 | Adder - 16 bit |

For simulation runs, the two smaller designs of 4-bit and 8-bit HSMs were exercised thoroughly. All of the possible input combinations of the two 4/8-bit inputs were input and all the final output signals were monitored. This proved the correctness of the algorithm, as a check of the schematic and Verilog code. The equations used in calculating gate counts (G), delay (D), and number of transitions (T), for the 32-bit HSM are provided as follows:

$$G(H32) = 2G(I32) + 3G(A32) + G(X1) + 2G(X32) + 3.88\ G(R16) + 1.88\ G(H16) + 2.5\ G(A64) + G(I64)$$

$$T(H32) = 2T(I32) + 3T(I32) + T(X1) + 2T(X32) + 3.88\ T(R16) + 1.88\ T(H16) + 2.5\ T(A64) + T(I64)$$

$$D(H32) = D(I32) + D(A32) + D(X32) + D(H16) + 2\ D(A64)$$

The right hand side of these equations shows the contributions of various blocks, such as inverter (I), adder (A), x or (X), ROM (R), and smaller HSM (H). The number of transitions is a measure of dynamic power dissipation, the dominant factor in power dissipation in today's technology. Other factors will matter more in the future, but dynamic power dissipation will continue to dominate and will continue to be the only parameter that may be optimized by designers.

Benchmark results from a paper are reproduced for two popular types of adders, a ripple carry adder and a carry look-ahead adder, and two dominant types of multipliers, an array multiplier and a Wallace multiplier. For these examples, the ROM Squarer of the present invention was implemented with smaller size building blocks (see the schematics for details) and computed the gate count, number of transitions, and delay for different size ROM Squarers. The subsequent Tables 2-5 show results of our HSM 16bit and 32-bit multipliers, in comparison to the Wallace multiplier and array multiplier of the same size. It is noted that in the present invention, a Wallace 8-bit multiplier and a carry look-ahead adder were used as building blocks to implement the HSMs. It is also noted that the examples show twice the gate counts, but a power dissipation (as measured with the number of transitions) of about 10% to 40% of the other multiplier, with an intermediate delay between the two currently used multiplier architectures.

TABLE 2

Benchmark: Ripple Carry Adder

| Size | Gate Count | Transitions | Delay |
|---|---|---|---|
| 4 | 36 | 23 | 12 |
| 8 | 72 | 45 | 20 |
| 16 | 144 | 90 | 36 |
| 32 | 288 | 182 | 68 |
| 64 | 576 | 366 | 132 |

TABLE 3

Benchmark: Carry Look-Ahead Adder

| Size | Gate Count | Transitions | Delay |
|---|---|---|---|
| 4 (Est) | 50 | 25 | 8 |
| 8 (Est) | 100 | 50 | 8 |
| 16 | 200 | 100 | 10 |
| 32 | 401 | 202 | 14 |
| 64 | 808 | 405 | 14 |

TABLE 4

Benchmark: Array Multiplier

| Size | Gate Count | Transitions | Delay |
|---|---|---|---|
| 4 (Est) | 144 | 49 | 25 |
| 8 | 567 | 583 | 50 |
| 16 | 2405 | 7348 | 98 |
| 32 | 9918 | 99,102 | 198 |

TABLE 5

Benchmark: Wallace Multiplier

| Size | Gate Count | Transitions | Delay |
|---|---|---|---|
| 4 (Est) | 153 | 97 | 24 |
| 8 | 613 | 573 | 35 |
| 16 | 2569 | 3874 | 51 |
| 32 | 10,417 | 19,548 | 63 |

Technical discussion is provided in the following tables. It is noted that it was attempted to tune the structures (for e.g., use of a 23-bit adder instead of a 32-bit adder). Follow-up tables show that the gate counts, number of transitions, and delay increases somewhat, but not drastically, when the non-standard size structures are replaced with standard 4/8/16/32-bit structures.

TABLE 6

Calculations: ROM Squarer

| Size, Type | Gate Count | Transitions | Delay |
|---|---|---|---|
| 4 | 30 | 20 | 4 |
| 8, Ripple, AM | 360 | 187 | 65 |
| 8, CLA WM | 416 | 197 | 41 |
| 16, Ripple, AM | 1575 | 1137 | 122 |
| 16, CLA, WM | 1845 | 1167 | 61 |

TABLE 7

Results: with Wallace 8 bit multiplier in the core and CLA

| Size | Gate Count | Transitions | Delay |
|---|---|---|---|
| 16 (HSM) | 4716 | 2831 | 78 |
| (WM) | (2569) | (3874) | (51) |
| (AM) | (2405) | (7348) | (98) |
| 32 (HSM) | 19,278 | 11,499 | 125 |
| (WM) | (19,548) | (19,548) | (63) |
| AM | (9918) | (99,102) | (198) |

As may be seen from Table 7, the HSM-16 and HSM-32 systems of the present invention have significantly lower power dissipation and comparable speed relative to the Wallace Multiplier and Array Multiplier implementations. While the gate counts were higher than other implementations, this may be reduced substantially. However, the emphasis was on re-usable regular localized structures. The overhead of object oriented methodology may be addressed.

These results already use somewhat tuned structures (e.g. use of a 23-bit adder instead of a 32-bit adder). If fully regular-size structures are used (8/16/32/64), then the counts increase a bit.

TABLE 8

Results: Use of regular structures of 8/16/32/64 width in HSM

| Size | Gate Count | Transitions | Delay |
|---|---|---|---|
| 16 | | | |
| Regular | 4916 | 3230 | 92 |
| Reduced | 4716 | 2831 | 78 |
| 32 | | | |
| Regular | 23,125 | 12,544 | 153 |
| Reduced | 19,278 | 11,499 | 125 |

The following examples are provided to show that the folding concept may be directly applied to many non-linear functions, thus taking advantage of the folding principle, independent of its application to the highly scaleable multiplier. In these examples, for simplicity sake, it is presumed that the input range is normalized to the range of 0 to 1. It should be noted, however, that the principle holds good for other ranges as well.

Example 1

Exponentiation. Let $X=Y-0.5$, where $Y$ is the original value (in the range of 0.5 to 1), which will take advantage of the folding principle by determining the exponentiation for $X$ (in the range of 0 to 0.5), so avoiding a larger look-up table, or a more involved computation. Thus, $Exp(Y)=Exp(X+0.5)= Exp(X)*Exp(0.5)=K*Exp(X)$, where $K=Exp(0.5)$ is a constant. However, this will not be a simple bit pattern, but a complicated sequence of 1's and 0's. Thus, this becomes a general multiplication, not a mere shift which we exploited in the HSM examples. Note that Exp (X) can now take advantage of further folding as needed. Thus the HSM may be used with the front end for folding the exponentiation function as needed. If a strict application of the HSM principle were followed, then Exp (Y) would have to be expanded as a Taylor series (sum of terms of increasing powers of Y and a constant), and folding principle applied wherever a square term appeared, and the HSM principle applied wherever a multiplication is needed. The proposed approach here would reduce the computational complexity and also give a useful way of exploiting the folding principle independent of the HSM implementation, or in conjunction with it.

Example 2

Cubic Polynomial. In a general expression of $3^{rd}$ order, as an example, both the linear and squared terms may be handled easily, the latter as an input to an adder, with the latter taking advantage of the HSM concept. In this example, the 'cubed' term is considered—such as $Y^3$ for this example. Let $Y=(X+0.5)$ as before. Then $Y^3=(X+0.5)^3=(X)^3+(0.5)^3+3*(X)^2*(0.5)+3*X*(0.5)$, where the "*" represents multiplication. The folding principle was applied to the $3^{rd}$ order term, with the HSM principle applied to the four terms of the resulting expansion. If a strict application of the HSM principle was followed, this would have been expanded as follows: $Y^3=Y*(Y)^2$, with the folding principle applied to the second term only, and the HSM concept exploited for the multiplication of the two terms on the right hand side.

The present invention has many utilities. A few comments from a recent review paper in the prestigious Proceedings of the IEEE show the applicability of the present invention. The authors distinguish between power-aware and low power systems. A power-aware system may seek to tradeoff power against performance, keep the average power dissipation constant, keep the peak power dissipation below a threshold (this extends the battery life significantly), and/or may compromise local power dissipation to achieve global optimization. Further, in a hard real-time system, worst-case analysis is used and the system over-designed, to make absolutely certain that the real-time constraints of a protocol are met. Thus, using structures that have less variability in their delay metrics will allow one to "pack" more capability or relax the design metrics. Both of these will enhance design productivity. Otherwise, considerably more time will be spent at the higher level over-designing, or iterating at the lower level, to meet the specifications. In the present invention, local efficiently designed structures allow us to define very tight tolerances on the delay characteristics. The authors also comment on how power-awareness is not limited to just mobile systems, but also to even desk top systems: according to Dataquest, worldwide total power dissipation of processors in PCs was 160 MW in 1992, growing to 9000 MW by 2001. A typical server farm with 25000 square feet of space and 8000 servers is estimated to consumer 2 MW of power. A case in point: A Briton was able to fry an egg for breakfast on top of a hot chip inside a PC (with an aluminum foil in-between). So, a power-aware methodology will also be used in future desk top systems, and the present invention could have a role there also.

In addition, higher order nonlinear functions are an integral part of the engineering domain, appearing in areas other than signal processing, in areas such as control, security, and communication algorithms, however implemented with a digital signal processor, using hardware implementations of shift, multiply, and add operations. As such, the present invention may be utilized in a wide variety of areas.

The present invention offers one or more of the following advantages:

1. Reconfigurable architecture: the building blocks of the present invention are simple enough that hierarchically one may break down the implementation to simplest building blocks or break down to the level that one may implement easily with an FPGA (field programmable gate array). Thus a "sea of gates" may be reconfigured to do a multiplication during a certain phase and made available to achieve other types of computations during other phases.
2. Dynamic reconfiguration: decision may be made either with software or hardware on when to invoke a different architecture. A decision may be triggered based on the power-speed tradeoffs, or even QOS (quality of service) needs, such as better resolution.
3. Localized structures: the present invention has localized structures that reduce cross talk, interference, and power dissipation. Further, the structure may be laid out very efficiently and compactly, as it is a well-defined "object" in the classical sense of object oriented design. This is not true of other multiplier implementations, where there may be many global signals whose number depends on the resolution (bit-width) of the multiplier.
4. Reuse: since the structures of the present invention are well-defined and local, reuse is enhanced. This means that design productivity is enhanced and performance may be better predicted ahead of time at higher levels of system design, instead of waiting for the implementation stage, by when it is too late to make any changes. As such, design variability is reduced.
5. Power Management: WinCE.net, the forward-looking embedded operating system of today, expects the devices to have power management features. Since multiplication is a major power hungry step of any digital signal processing algorithm, the methodology of the present invention provides a mechanism to achieve global power optimization.
6. Global Optimization: as per Dr. Goldblatt's Theory of Constraints, on occasion, local optimization may have to be compromised to achieve global optimization. The method of present invention may reconfigure the structure based on power-speed tradeoffs. It is not just a mechanism to reduce power, but also a mechanism to enhance performance at the cost of power dissipation, if that is the goal of global optimization.
7. Open Architecture: the 32 and 64-bit HSMs were built with 8-bit width Wallace multipliers, one of the two dominant multiplier topologies. The present invention could have been easily built with 8-bit array multipliers or any other compact multiplier implementation that might evolve in the future, if for some reason that provides a decided advantage in one respect or the other. In other words, the present invention is a flexible architecture that may take advantage of future innovations in this domain.
8. Low interference and longer reliable service: in the current DSM (deep sub-micron) era (0.35 micron feature size or less) interference has become a big issue. Reliability of the system for continuous operation is compromised by the presence of global signals such as clocks and buses. By implementing local structures that do not depend on global signals or by avoiding global signals within the implementation, the present invention reduces the effects of interference, thus enhancing reliability and longer reliable service. The reliable service is longer as a result of reduced power dissipation for the same operation as before.
9. Better Design Productivity: hard real-time systems are over-designed to account for variability in the delay characteristics of the hardware subsystems. Tighter tolerance in delay values ensues from localized structures of the present invention. Thus, the designer will not need to over-design, and/or iterate later to make the system work, thus enhancing design productivity.
10. Power Aware strategies of desk top systems: as global computing needs and usage increases, there will be a need and a desire to conserve power. The present invention may be used with multipliers, which are one of the most power hungry elements. The multipliers may be used in digital signal processing, one of the most widely used algorithmic domains.

Although the illustrative embodiments of the present disclosure have been described herein with reference to the accompanying drawings and examples, it is to be understood that the disclosure is not limited to those precise embodiments, and various other changes and modifications may be affected therein by one skilled in the art without departing from the scope of spirit of the disclosure. All such changes and modifications are intended to be included within the scope of the disclosure as defined by the appended claims.

The present invention may be realized in hardware, software, firmware or a combination of hardware, software and firmware. A method, system and apparatus that has been configured in accordance with the present invention may be realized in a centralized fashion in one computer system, or in a distributed fashion where different elements are spread across several interconnected computer systems. Any kind of computer system, or other apparatus adapted for carrying out the methods described herein, is suited.

A typical combination of hardware and software could be an embedded signal processing system with a computer program that, when being loaded and executed, controls the embedded system such that it carries out the methods described herein. The present invention may also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention may be embodied in other specific forms without departing from the spirit or essential attributes thereof, and accordingly, reference should be had to the following claims, rather than to the foregoing specification, as indicating the scope of the invention.

What is claimed is:

1. A method for reducing power dissipation in a reconfigurable computation circuit architecture, comprising the steps of:

determining a selected electrical power utilization using one or more factors;

determining a selected level of power dissipation reduction using one or more factors;

translating tradeoffs between the one or more factors in the step of determining a selected level of power dissipation reduction to a substantially equivalent change in one or more of digital signal processing algorithms, functionalities, rank order, precision, sequencing, or a combination thereof;
determining one or more modes of operation that may be used in a system;
estimating savings in power dissipation and determining a time period for each of the one or more modes that may be used in the system;
using a hardware reconfiguration mechanism having reconfigurable connectors to switch to an appropriate bit-width multiplication and higher order polynomial functions that reduces power dissipation; and
dynamically monitor a time period of the energy mode of the system and revert to an original mode or a different mode of power usage as needed.

2. The method of claim 1, wherein the step of determining a selected electrical power utilization using one or more factors is performed either a priori or dynamically, and wherein the one or more factors are selected from an estimation of power dissipation, monitored power consumption, battery performance, economic considerations, thermal considerations, or a combination thereof.

3. The method of claim 1, wherein the step of determining a selected level of power dissipation reduction using one or more factors uses one or more factors selected from quality of service, lower image resolution, higher image resolution, noisier fidelity voice signal, higher fidelity voice signal less, more secure communication, more reliable communication, or a combination thereof.

4. A machine readable storage having stored thereon a computer program, said computer program comprising a routine set of instructions for causing the machine to perform the steps of:
determining a selected electrical power utilization using one or more factors;
determining a selected level of power dissipation reduction using one or more factors;
translating tradeoffs between the one or more factors in the step of determining a selected level of power dissipation reduction to a substantially equivalent change in one or more of digital signal processing algorithms, functionalities, rank order, precision, sequencing, or a combination thereof;
determining one or more modes of operation that may be used in a system;
estimating savings in power dissipation and determining a time period for each of the one or more modes that may be used in the system;
using a software or hardware reconfiguration mechanism to switch to an appropriate bit-width multiplication and higher order polynomial functions that reduces power dissipation; and
dynamically monitor a time period of the energy mode of the system and revert to an original mode or a different mode of power usage as needed.

5. The machine readable storage of claim 4, wherein the step of determining a selected electrical power utilization using one or more factors is performed either a priori or dynamically, and wherein the one or more factors are selected from an estimation of power dissipation, monitored power consumption, battery performance, economic considerations, thermal considerations, or a combination thereof.

6. The machine readable storage of claim 4, wherein the step of determining a selected level of power dissipation reduction using one or more factors uses one or more factors selected from quality of service, lower image resolution, higher image resolution, noisier fidelity voice signal, higher fidelity voice signal less, more secure communication, more reliable communication, or a combination thereof.

7. The method of claim 1, comprising applying an absolute function to one or more inputs to determine the higher order polynomial functions.

8. The method of claim 1, comprising determining the higher order polynomial functions based on a first folding value and a second folding value, wherein the first folding value is based in part on a sum of a multiplicand and a multiplier, and wherein the second folding value is based in part on a difference of the multiplicand and the multiplier.

9. The method of claim 1, comprising applying a folding process to at least one of a multiplicand and a multiplier to determine the higher order polynomial functions when the multiplicand and the multiplier do not meet a folding threshold.

10. The method of claim 9, wherein the folding threshold is based on device resources.

11. The machine readable storage of claim 4, comprising applying an absolute function to one or more inputs to determine the higher order polynomial functions.

12. The machine readable storage of claim 4, comprising determining the higher order polynomial functions based on a first folding value and a second folding value, wherein the first folding value is based in part on a sum of a multiplicand and a multiplier, and wherein the second folding value is based in part on a difference of the multiplicand and the multiplier.

13. The machine readable storage of claim 4, comprising applying a folding process to at least one of a multiplicand and a multiplier to determine the higher order polynomial functions when the multiplicand and the multiplier do not meet a folding threshold.

14. The machine readable storage of claim 13, wherein the folding threshold is based on device resources.

15. A method for reducing power dissipation in a reconfigurable computation circuit architecture, comprising:
determining one or more modes of operation that may be used in a system;
estimating savings in power dissipation and determining a time period for each of the one or more modes that may be used in the system;
using a software or hardware reconfiguration mechanism having reconfigurable connectors to select a bit-width multiplication and higher order polynomial functions, wherein the selected bit-width multiplication and higher order polynomial functions reduce power dissipation as compared to non-selected bit-width multiplication and higher order polynomial functions; and
dynamically monitor a time period of the energy mode of the system and revert to an original mode or a different mode of power usage.

16. The method of claim 15, further comprising:
determining a selected electrical power utilization using one or more factors;
determining a selected level of power dissipation reduction using one or more factors; and
translating tradeoffs between the one or more factors in the step of determining a selected level of power dissipation reduction to a substantially equivalent change in one or more of digital signal processing algorithms, functionalities, rank order, precision, sequencing, or a combination thereof.

* * * * *